United States Patent
Bermudez et al.

(10) Patent No.: US 10,878,440 B1
(45) Date of Patent: Dec. 29, 2020

(54) AFFINITY REWARD AGGREGATION AND REWARD EXCHANGE TECHNIQUES AND SYSTEM

(71) Applicant: Capital One Services, LLC, McLean, VA (US)

(72) Inventors: Sophie Bermudez, Washington, DC (US); Salik Shah, Washington, DC (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/731,033

(22) Filed: Dec. 31, 2019

(51) Int. Cl.
*G06Q 30/00* (2012.01)
*G06Q 30/02* (2012.01)
*G06Q 20/32* (2012.01)
*G06Q 20/34* (2012.01)
*G05B 19/418* (2006.01)

(52) U.S. Cl.
CPC ....... *G06Q 30/0229* (2013.01); *G06Q 20/322* (2013.01); *G06Q 20/3572* (2013.01); *G06Q 30/0233* (2013.01); *G06Q 30/0236* (2013.01)

(58) Field of Classification Search
CPC ............. G06Q 30/0229; G06Q 20/322; G06Q 20/3572; G06Q 30/0236; G06Q 30/0233
See application file for complete search history.

(56) References Cited

U.S. PATENT DOCUMENTS

| | | | |
|---|---|---|---|
| 8,489,112 B2 | 7/2013 | Roeding et al. | |
| 2005/0021401 A1* | 1/2005 | Postrel | G06Q 30/0235 |
| | | | 705/14.3 |
| 2005/0045718 A1* | 3/2005 | Bortolin | G06Q 20/346 |
| | | | 235/383 |
| 2006/0122874 A1* | 6/2006 | Postrel | G06Q 30/02 |
| | | | 705/26.1 |
| 2009/0216644 A1 | 8/2009 | Summer et al. | |
| 2009/0222358 A1* | 9/2009 | Bednarek | G06Q 30/0207 |
| | | | 705/26.1 |
| 2009/0299788 A1* | 12/2009 | Huber | H04W 88/08 |
| | | | 455/456.3 |
| 2012/0101881 A1* | 4/2012 | Taylor | G06Q 20/12 |
| | | | 705/14.13 |
| 2012/0191525 A1* | 7/2012 | Singh | G06Q 30/0226 |
| | | | 705/14.33 |
| 2014/0006165 A1 | 1/2014 | Grigg et al. | |
| 2014/0032297 A1 | 1/2014 | Germann et al. | |
| 2014/0040001 A1 | 2/2014 | Harvey et al. | |

(Continued)

OTHER PUBLICATIONS

Blockchain-based Universal Loyalty Platform (Year: 2019).*

*Primary Examiner* — Maria V Vanderhorst
(74) *Attorney, Agent, or Firm* — Kacvinsky Daisak Bluni PLLC

(57) ABSTRACT

A system and techniques are provided that enable an affinity pooling application executing on the mobile device and an aggregation of affinity reward programs. The affinity pooling application may enable a mobile device to enroll in the aggregation of affinity reward program. The enrollment with an affinity exchange server enables the mobile device to select affinity reward programs for participation and management by the affinity exchange server. The affinity exchange server may enable determination of an affinity reward exchange rate. Other examples and techniques are also disclosed.

18 Claims, 8 Drawing Sheets

(56) References Cited

U.S. PATENT DOCUMENTS

| | | |
|---|---|---|
| 2016/0005077 A1 | 1/2016 | McDevitt et al. |
| 2017/0300891 A1 | 10/2017 | Popescu et al. |
| 2018/0276710 A1* | 9/2018 | Tietzen ................. G06N 20/00 |
| 2019/0392489 A1* | 12/2019 | Tietzen ................. H04L 9/0637 |

* cited by examiner

AFFINITY REWARD AGGREGATION AND REWARD EXCHANGE TECHNIQUES AND SYSTEM

BACKGROUND

Affinity reward programs and systems that manage the individual affinity rewards are becoming more prevalent. Consumers may often participate in a number of different merchants' affinity reward programs and may have to manage each respective affinity rewards program in which they participate utilizing a respective computer application for each respective affinity reward program. This may prove cumbersome and time consuming, and, as a result, the consumer may not fully realize the benefits of the affinity reward programs in which the consumer participates.

Over time, the consumer may tire of the offerings provided by the merchants that offer the affinity rewards program in which they participate. As a result, the consumer may have a large balance of affinity rewards that may either expire or go unused. As a result, the consumer may lose the value of the unused or expired affinity rewards. In addition, the consumer may wish to use services or consume products provided by different merchants. Early on the consumer may not participate in an affinity rewards program provided by the different merchants and may not have any affinity rewards accumulated. As a result, the consumer may end up paying more for products or services provided by the merchant.

It would be beneficial of a system was available that enabled a consumer to realize the value of potentially lost affinity rewards and were also able to obtain affinity rewards from different merchants with whom the consumer recently began patronizing that could be applied to immediate purchases at the respective different merchants.

SUMMARY

Disclosed is a method that includes receiving a request to exchange affinity rewards associated with a mobile device at an affinity exchange server. The request is sent from an affinity pooling application executing on the mobile device and the request includes a merchant identifier identifying a merchant affinity rewards program. The affinity exchange server may determine that affinity rewards associated with the merchant identifier are available to the mobile device. Each affinity reward of the affinity rewards has a reward value. The affinity pooling application may, in response to the determination that affinity rewards are available to the mobile device, present a menu of affinity rewards offered by a number of different affinity reward participants that are available to the mobile device for use in a transaction with a merchant related to the merchant identifier. The presented menu may include a total affinity reward value for the affinity rewards listed in the menu that is based on a rewards exchange rate between each affinity reward offered by the number of different affinity reward participants and the merchant identified by the merchant identifier. A selection of one or more affinity rewards of an aggregation account of affinity rewards from the presented menu may be received. A transaction may be enabled between the merchant related to the merchant identifier and a payment card account associated with the mobile device in which reward values of the selected one or more affinity rewards are applied to the transaction.

An example of a system that includes an affinity exchange server and a mobile device is provided. The affinity exchange server may include a processor and an affinity resolution component. The affinity resolution component may be operable to manage an aggregation of affinity rewards programs for a number of affinity reward program enrollees. The mobile device may include a mobile device processor, a radio-frequency transceiver, an output device, and a mobile device memory that stores an affinity pooling application. The mobile device may be a participating device in one or more individual affinity reward programs. The mobile device processor when executing the affinity pooling application stored in the mobile device memory may be operable to enroll the mobile device in an aggregation of affinity reward programs provided by the affinity exchange server. The enrolling may include providing affinity reward program information related to one or more individual affinity reward programs in which the mobile device is the participating device to the affinity exchange server. In response to being enrolled, the mobile device may receive a mobile device aggregation account number that is related to a payment card associated with the mobile device. Each of the one or more individual affinity reward programs may be associated as an affinity reward group under the mobile device aggregation account number. A cumulative neutral value of the affinity rewards points from each of the one or more individual affinity reward programs associated in the affinity reward group may be presented on the output device of the mobile devices. An individual affinity reward program of the one or more individual affinity reward programs may be selected from the affinity reward group for use in a transaction with a merchant that accepts affinity rewards associated with the selected individual affinity reward program. The selected individual affinity reward program, an affinity reward value of affinity rewards associated with the selected individual affinity reward program, and a neutral affinity reward value for the affinity reward value of affinity rewards associated with selected individual affinity reward program may be presented on the output device, wherein the neutral affinity reward value is based on an affinity reward exchange rate related to the one or more individual affinity reward programs from the affinity reward group as set by the affinity exchange server. The mobile device processor may engage in a transaction utilizing affinity rewards from the selected individual affinity reward program with a point of sale device at a merchant that participates in the selected individual affinity reward program.

A non-transitory computer readable medium embodied with programming code is provided. The programming code embodied on the non-transitory computer readable medium may enable a processor to provide an affinity pooling application engage in a transaction utilizing affinity rewards from the selected individual affinity reward program with a point of sale device at a merchant that participates in the selected individual affinity reward program. The affinity pooling application executing on a mobile device may associate an aggregation account with the mobile device and associate a payment card related to the mobile device with the aggregation account. A message may be received that includes a list of affinity reward programs managed by the mobile device and an affinity reward value for each of the affinity reward programs in the list. The list of affinity reward programs may be stored in a data storage in relation to the aggregation accounts. Merchants may be identified that participate in the affinity reward programs in the list of affinity reward programs. Transaction information may be requested from a point of sale transaction server for each of the identified merchants. The transaction information may include an indication of an affinity reward program and an affinity reward value related to the aggregation account that were applied in a transaction. For each of the identified merchants, a number of transactions may be counted in which an affinity reward value was applied in a respective transaction. Based on the counted number of transactions for each respective merchant of the identified merchants, an affinity reward exchange rate may be generated for each affinity reward program in the list of affinity reward programs. The affinity reward exchange rate is relative to a neutral affinity reward value. A total affinity reward value of each affinity aggregation account may be updated based on the generated affinity reward exchange rate. The updated total affinity reward value of each affinity aggregation account may be sent to a mobile device associated with each affinity aggregation account.

DETAILED DESCRIPTION

The example system and techniques described herein enable a user to aggregate affinity rewards from a number of different affinity reward programs in an aggregation account of affinity rewards. The aggregation account may, for example, be managed by an affinity pooling application operable on a mobile device of the respective user. In an example, an enterprise, such as a financial institution whose clients are merchants and users, a large retail conglomerate, or the like, may provide an affinity exchange server that manages an exchange of affinity rewards among a number of affinity reward programs offered by a number of different merchants.

The disclosed example system and techniques are described with reference to FIGS. 1-6. It may be helpful to describe an example of a system configuration operable to enable the affinity reward aggregation and exchange techniques as described herein.

Figure 1:
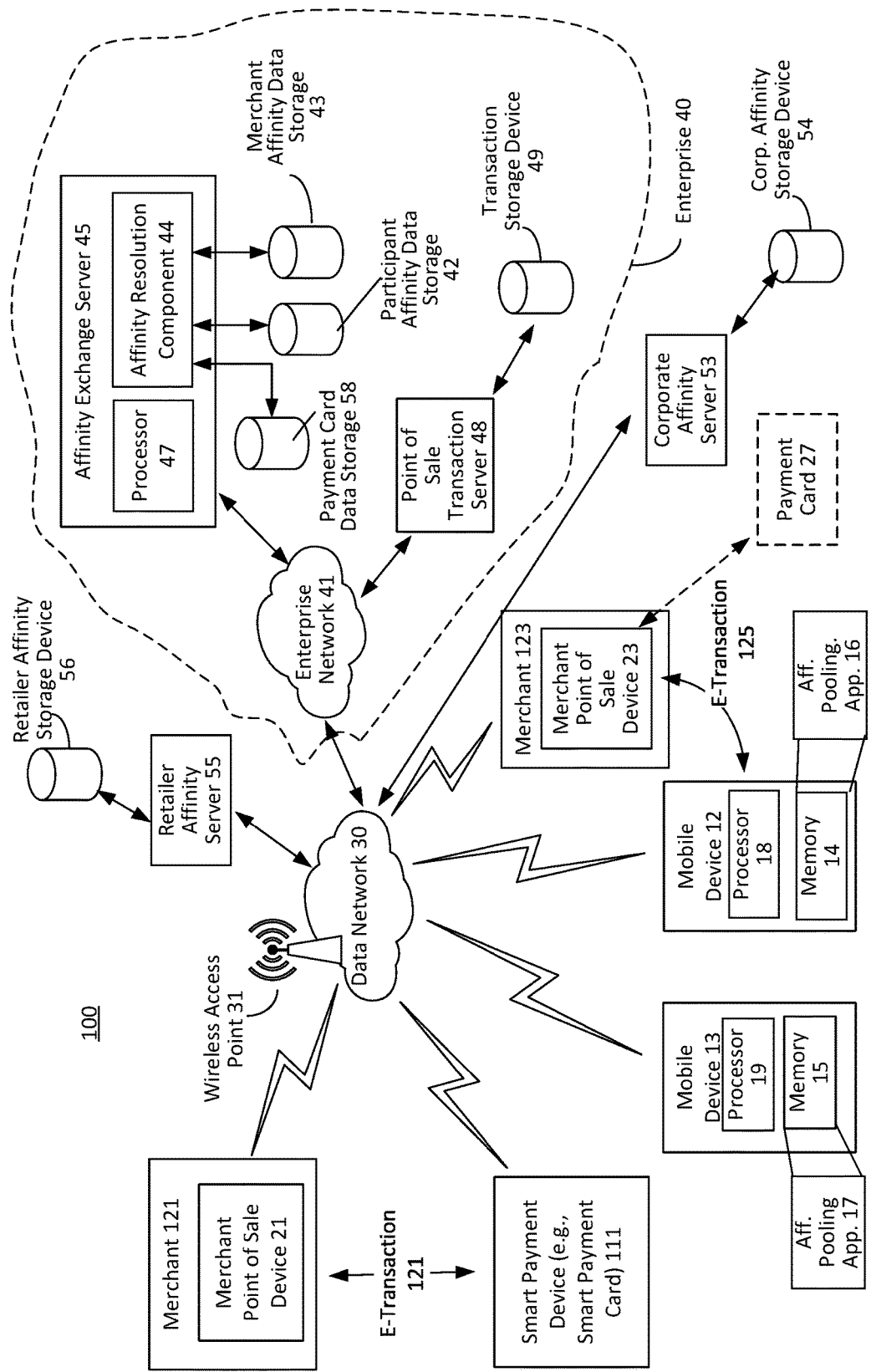
FIG. 1 shows a system example for implementing the example techniques and processes described herein.

FIG. 1 shows a system example for implementing examples of techniques and processes for aggregating and exchanging affinity rewards. The system 100 may include mobile devices, such as 12 and 13, and an affinity exchange server, such as 45, as well as a merchant point of sale device, such as 21 and 23, and a smart payment device, such as 111, a data network 30, an enterprise 40, and a retail affinity server 55.

In the example, the data network 30 may include wired and wireless access points, such as 31, and may be operable to exchange data communications between devices, such as 11-13, 21, 23 and 55 that are coupled to the data network 30 via an access point (e.g., 31). The data network 30 may be coupled to an enterprise, such as 40.

The enterprise 40 may, for example, include an enterprise network 41, the affinity exchange server 45, the point of sale transaction server 48 as well as data storage devices (e.g., RAID storage devices, cloud-based storage, or the like). The enterprise network 41 may be coupled to the data network 30 and be operable to manage communications between components (e.g., the affinity exchange server 45, point of sale transaction server 48 and the like) within the enterprise 40.

The affinity exchange server 45 may include a processor 47 and an affinity resolution component 44. The affinity exchange server 45 may be coupled to data storage, such as participant affinity data storage 42, payment card data storage 58, and merchant affinity data storage 43 may be data storage devices, such as redundant array of inexpensive disks (RAID) storage devices, a network attached storage (NAS), or the like.

The participant affinity data storage 42 may store information related to holders of affinity aggregation account, such as affinity reward programs included in each participant's affinity aggregation account, mobile device or devices associated with each participant's affinity aggregation account, encrypted payment card identifiers associated with the mobile device or devices associated with the participant's affinity aggregation account, linkages between affinity aggregation accounts (e.g., multiple family member affinity aggregation accounts, group-linked affinity aggregation accounts), and the like. The payment card storage 58 may store encrypted payment card information related to affinity reward program participants that have affinity aggregation accounts. For example, the payment card storage 58 may store encrypted payment card numbers, identifiers of the mobile device associated with the payment card, or the like. The merchant affinity data storage 43 may store information related to merchant affinity programs, such as the affinity reward offerings by each participating merchant, identifiers of the participating merchants, and the like. The affinity resolution component 44 may be operable to manage the aggregation of affinity rewards programs for a number of affinity reward program enrollees and the affinity reward program offerors. The affinity resolution component 44 may be software, hardware, firmware or a combination of each.

The mobile device 12 may include a mobile device processor 18 and a mobile device memory 14. Similarly, the mobile device 13 may include a mobile device processor 19 and a mobile device memory 15. In the example, the mobile device processor 18 of mobile device 12 may be coupled to the mobile device memory 14. and a mobile device memory mobile device memory 14 of mobile device 12 may be operable to store an affinity pooling application 16 and related data, such as data usable and data generated by the affinity pooling application 16. Similarly, the mobile device memory 15 of mobile device 13 may be operable to store an affinity pooling application 17 and related data, such as data usable and data generated by the affinity pooling application 17. The mobile devices 12 and 13 may include other components such as a mobile device processor, such as 18 and 19, respectively, a radio-frequency transceiver (not shown in this example), an output device (not shown in this example) that are described in more detail with reference to a later example.

In one or more examples, the affinity pooling application 16 may be coupled to a digital wallet (not shown) in the mobile device 12. The digital wallet may be operable, via the mobile device, to participate in a transaction with a point of sale device 23 of merchant 123. The point of sale device 23 may be coupled to the point of sale transaction server 48.

In the example of FIG. 1, the mobile devices 12 and 13 may be a device that participates (i.e., a participating device) in one or more individual affinity reward programs. An affinity reward program may be a participation-based incentive tool used by merchants, service providers and others to encourage users to purchase a product, a service or the like from the merchants, service providers and the others in exchange for a "reward." The rewards may be discounts on a purchase or future purchase, a credit toward future purchases, or the like. Each merchant and service provider may offer merchant-specific rewards or service provider-specific rewards that are redeemable only at that specific merchant or service provider.

Figure 2A:
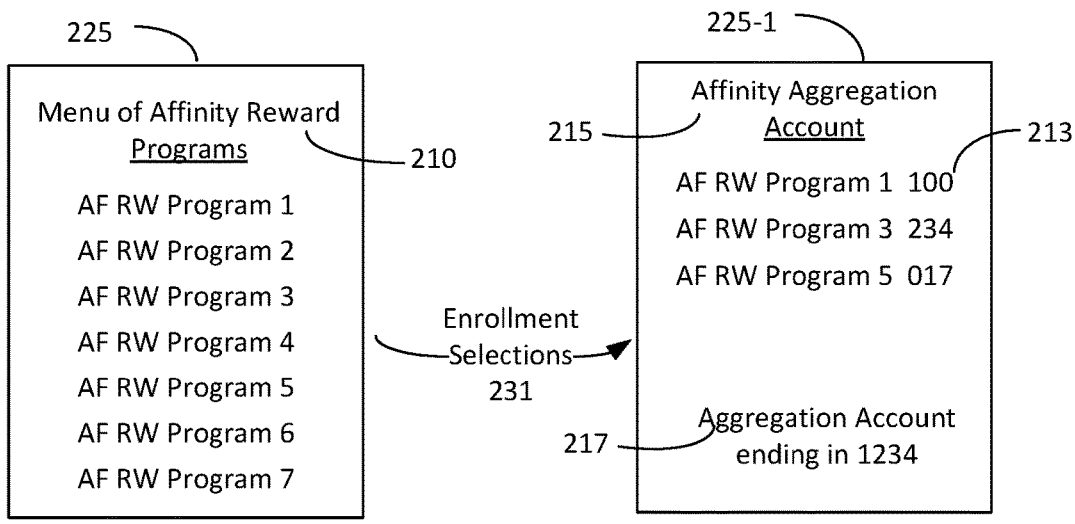
FIG. 2A illustrates examples of user interfaces presented by an example of an affinity pooling application during an enrollment process example.

In an operational example, the mobile device processor, such as 19 of mobile device 13, when executing the affinity pooling application 17 stored in the mobile device memory 15 may be operable to enroll the mobile device in an aggregation of affinity reward programs provided by the affinity exchange server, such as 45. The enrollment may, for example, include providing affinity reward program information to the affinity exchange server 45. FIG. 2A illustrates examples of user interfaces presented by an example of an affinity pooling application during an enrollment process example. In the example shown in FIG. 2A, a menu 210 of affinity reward programs information may be presented on a user interface (e.g., a touch-screen display or the like) 225. The menu 210 may include list with a number of affinity reward programs, such as affinity (AF) reward (RW) program 1, AF RW program 2, AF RW program 3, AF RW program 4, AF RW program 5, AF RW program 6, and AF RW program 7.

Upon an enrollment selection 231 of an affinity reward program, affinity reward program information may be provided to an affinity pooling application executing on the mobile device 13 and may be forwarded to the affinity exchange server 45 via the data network 30 and enterprise network 41. The provided affinity reward program information may include a name of the affinity reward program or programs that the mobile device is being enrolled, an identifier of the mobile device (such as an International Mobile Equipment Identity (IMEI), a cellular number, or the like), a user name, or password. The provided affinity reward program information may relate to one or more individual affinity reward programs, such as AF RW Program 1, AF RW Program 3, and AF RW Program 5, in which the mobile device 13 is the participating device. The information provided during enrollment to the affinity exchange server 45 may be stored, for example, in the participant affinity data storage 42. Alternatively, or in addition, the enrollment information may be stored in the merchant affinity data storage 43. For example, the information related to the mobile device and/or payment card may be stored in a location of the merchant affinity data storage 43 corresponding to the selected merchants.

Figure 2B:
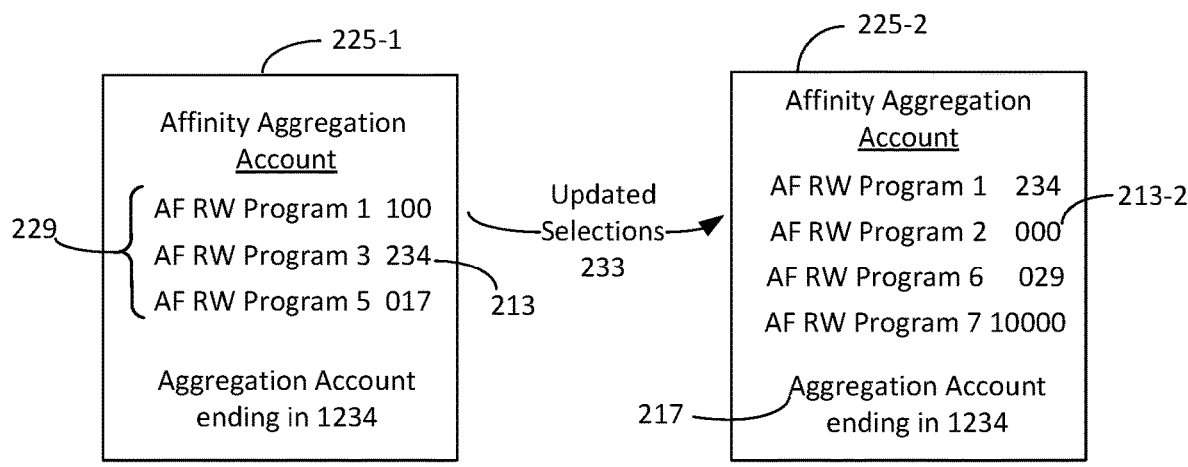
FIG. 2B illustrates examples of user interfaces in response to an example of a process for updating affinity reward programs in an affinity aggregation account.

In response to enrolling a mobile device in the aggregation of affinity reward programs with the affinity exchange server 45, the affinity pooling application 17 executing on the mobile device 13 may receive a message including a mobile device aggregation account number that is related to a payment card (shown in a later example) associated with the mobile device 13. The affinity pooling application 17 may present, via a user interface 225-1 on the mobile device 13, an affinity aggregation account 215, which includes a list of the affinity reward programs selected during enrollment and the balance of reward points. In an example, each of the one or more individual affinity reward programs selected during enrollment may be associated as an affinity reward group under the mobile device aggregation account number. Information related to the aggregation account number, such as 217, may be presented in the user interface 225-1 of the mobile device 13. Of course, after enrollment, the individual affinity reward programs within the affinity reward group 229 associated with the mobile device 13 may be changed in response to a user input. As shown in the example of FIG. 2B, the user interface 225-1 may present on the mobile device 13 the affinity reward programs (i.e., affinity (AF) reward (RW) programs 1, 3 and 5) of the affinity reward group 229 and the respective affinity reward point balances 213. In an example, the affinity aggregation account associated with the mobile device 13 may be updated with selections, via updated selections 233, of one or more other affinity reward programs, such as AF RW program 2, AF RW program 6 and AF RW program 7. Each of the updated affinity reward programs, AF RW program 2, AF RW program 6 and AF RW program 7, as well as remaining AF RW program 1 may have affinity reward point balances 213-1. Based on the updated selections 233, the one or more other affinity reward programs may be added to the affinity reward group associated with the mobile device, while one of the affinity reward programs selected at enrollment is dropped, such as AF RW programs 3 and 5.

FIG. 2B illustrates examples of user interfaces in response to an example of a process for updating affinity reward programs in an affinity aggregation account. An updated presentation in user interface 225-2 may present the affinity aggregation account with updated affinity (AF) reward (RW) programs 1, 2, 6 and 7 and respective affinity reward point balances as shown in FIG. 2B.

In an example, the neutral affinity reward value of the affinity rewards points from each of the one or more individual affinity reward programs associated in the affinity reward group is determined by the affinity exchange server using an affinity reward exchange rate, and the affinity reward exchange rate is based on transaction information provided by the point of sale transaction server.

In another example, a cumulative neutral value of the affinity rewards points from each of the one or more individual affinity reward programs associated in the affinity reward group may be presented on an output device (shown in a later example) of the mobile device 13. For example, an individual affinity reward program of the one or more individual affinity reward programs may be selected from the affinity reward group for use in a transaction with a merchant, such as 121, that accepts affinity rewards associated with the selected individual affinity reward program. There may be a number of different affinity rewards programs from which to select. The selected individual affinity reward program, an affinity reward value of affinity rewards associated with the selected individual affinity reward program, and a neutral affinity reward value for the affinity reward value of affinity rewards associated with selected individual affinity reward program may be presented on the output device of the mobile device 13. The neutral affinity reward value may be based on an affinity reward exchange rate related to the one or more individual affinity reward programs from the affinity reward group as set by the affinity exchange server. The affinity pooling application when executed by the mobile device processor 19 may engage in a transaction utilizing affinity rewards from the selected individual affinity reward program with a point of sale device 21 or 23 at a merchant 121 or 123, respectively, that participates in the selected individual affinity reward program.

Returning to the system example of FIG. 1, the affinity pooling application may be operable, when executed by a processor on a mobile device or the like, to perform additional functions than those described above. For example, the affinity pooling application may be operable when executed by a processor of the mobile device, such as 12 or 13, to indicate to the affinity exchange server 45 a selection (e.g., updated selections 233) of another affinity reward program in the aggregation of affinity reward programs for presentation of additional information on an output (shown in a later example) of the mobile device 13. The affinity pooling application may receive a reward value of affinity rewards available from the individual selected affinity reward program. For example, the affinity pooling application may cause the processor to store in the mobile device memory information such as the balance of reward points for each affinity reward program. The affinity pooling application may also cause the processor to present, on the output, such as touch-screen display of the mobile device 13 that presents a user interface (not shown in this example) with the received reward value with a prompt to select additional affinity rewards to be converted from the neutral affinity reward value.

In another example, the affinity pooling application may also be operable to perform other functions, such as collecting information related to one or more affinity rewards programs in which the mobile device is a participant. The collected information may be a merchant name, a maximum amount spent by a user at a location of the named merchant, location coordinates (whether GPS, cellular location or Wi-Fi location), typical number of reward values used per visit, or the like. The affinity pooling application may associate each of the one or more affinity programs with the payment card related to the mobile device aggregation account number.

In another example, the affinity pooling application 17 may also establish a connection, via the data network 30 and the enterprise network 41, with the point of sale transaction server 48. The affinity pooling application 17 may have permissions and be authenticated to access transaction records via the point of sale transaction server 48. Based on the accessed transaction records, the affinity pooling application 17 may identify merchants, such as 121, that offer affinity reward programs. The affinity pooling application 17 may review the collected information to determine whether the mobile device is a participant in the affinity reward programs offered by the identified merchants. In response to a result of the review indicating the mobile device is a non-participant in the affinity reward programs offered by the identified merchant, the affinity pooling application 17 may send a notification for presentation on the user interface of the mobile device. The notification when presented may provide an option to join the affinity reward programs with the affinity aggregation account associated with the mobile device 13. The user interface In another example, the affinity exchange server 45 may also be operable to perform additional functions. For example, the affinity exchange server 45 may be operable to identify each individual affinity reward program that the mobile device 12 has included during enrollment in the aggregation of affinity reward program. Each individual affinity reward program enrollment in the aggregation of affinity reward programs may be managed by the affinity exchange server 45. For example, the affinity exchange server 45 may obtain affinity reward values for rewards from the affinity reward program information provided by the mobile device 12 during enrollment. The affinity exchange server 45 may retrieve transaction information from the point of sale transaction server 48. In the example, the retrieved transaction information may be related to transactions executed by merchants that participate in each identified, individual affinity reward program.

The affinity exchange server 45 may be operable to generate a neutral affinity reward exchange rate for an affinity reward value for each individual affinity reward program of the affinity reward programs based on the retrieved transaction information. The affinity exchange server 45 may use the generated neutral affinity reward exchange rate for the affinity reward value for each individual affinity reward program to convert the affinity reward value for each individual affinity reward program in which the mobile device included during enrollment to a neutral affinity reward value. In an example, the neutral affinity reward exchange rate may be determined, for example, by the affinity exchange server 45, based on popularity of different affinity rewards with respect to one another, with the more popular affinity rewards having greater value with respect to the less popular affinity rewards. Alternatively, the neutral affinity reward exchange rate may be determined based on the respective monetary value of the affinity reward from all of the merchants and the relative value of each individual affinity reward in the aggregation of affinity reward program may be based on the differences in monetary value.

After converting the affinity reward value, the affinity exchange server 45 may send the generated to the neutral affinity reward exchange rate for the affinity reward value for each individual affinity reward program of the individual affinity reward programs and the neutral affinity reward value for each individual affinity reward program to the mobile device 12.

As mentioned above, the system 100 may include a point of sale transaction server 48. In more detail, the point of sale transaction server 48 may include a processor coupled to a transaction storage device 49. The point of sale transaction server 48 may include a communication interface (not shown). The point of sale transaction server 48 may be coupled via the communication interface to the enterprise network 41, the affinity exchange server 45, the data network 30, the merchants 121, 123 and the mobile devices 12, 13, and the smart payment device 111.

Each merchant may include a point of sale device, such as 21 for merchant 121 and 23 for merchant 123. In an operational example, the point of sale device, such as 23, may be operable to perform functions, such as receiving from a mobile device, such as 12 an indication of affinity reward values to be applied to a transaction, such as e-transaction 125. The point of sale device 23 may be operable to send acknowledgement of receipt of affinity reward values to be applied to the transaction to the mobile device 12 and apply the affinity reward values to a transaction price. For example, the mobile device 12 may communicate with the affinity exchange server 45, which may be operable to facilitate a transaction utilizing affinity rewards between the point of sale device 23 and the mobile device 12. Any balance of the transaction price remaining after application of the affinity reward values to the transaction, the point of sale device 23 may receive payment of the remaining balance via a payment card account associated with the mobile device 12. The payment may be received from a digital wallet on the mobile device 12 or a payment card 27 associated with the mobile device 12. The point of sale device 23 may confirm payment of the transaction price with the point of sale transaction server 48.

Figure 3:
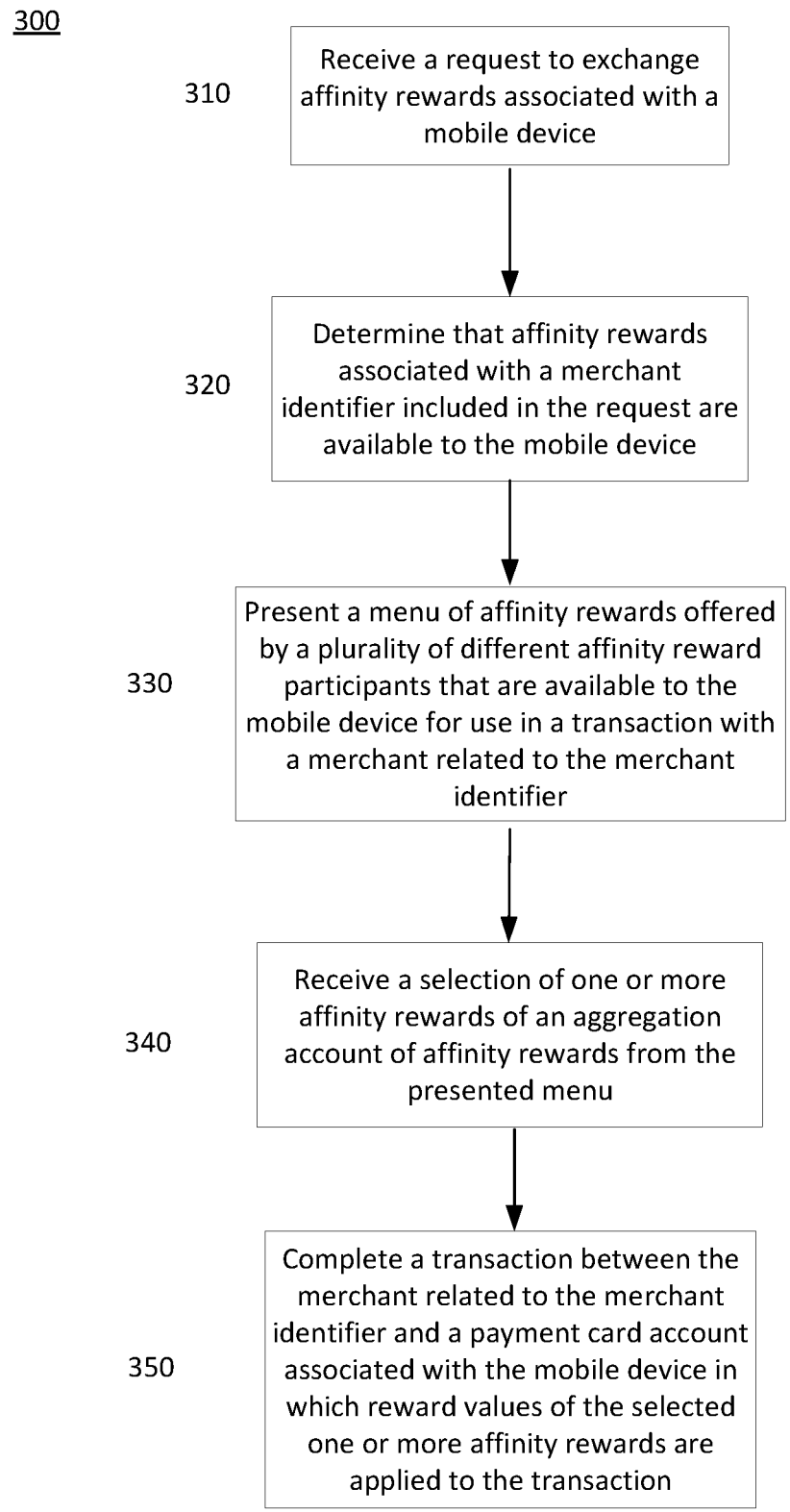
FIG. 3 illustrates an example of a process for exchanging affinity rewards in affinity reward programs associated with an example of a mobile device.

FIG. 3 illustrates an example of a process for exchanging affinity rewards in affinity reward programs associated with a mobile device. In this example, an affinity exchange server such as 45 of FIG. 1 may be operable to perform different functions related to the exchange of affinity reward points in a first affinity reward program with affinity reward points in a second affinity reward program.

In the example of FIG. 3, the affinity exchange server may receive a request from an affinity pooling application executing on a mobile device to access the affinity exchange server. The process 300 of FIG. 3 includes a number of steps. At 310, the affinity exchange server may receive a request to exchange affinity rewards associated with a mobile device at an affinity exchange server. For example, the request may be sent from an affinity pooling application executing on a mobile device. In a first example, the request may include a first merchant identifier identifying a first merchant affinity rewards program. In another example, the request may include additional information such as a first merchant identifier identifying a first merchant affinity rewards program, a second merchant identifier identifying a second merchant affinity rewards program and an amount of first affinity reward points being requested to be exchanged into second affinity reward points. Each affinity reward of the affinity reward programs has a reward value. In the examples, an identifier of the mobile device or an identifier of the affinity pooling application may also be sent with the request or be included within the sent request.

At 320, the affinity exchange server may determine that affinity rewards associated with the first merchant identifier are available to the mobile device. For example, the affinity exchange server may access the participant affinity data storage 42 of FIG. 1, to check whether there is a balance of affinity reward points with the affinity reward program associated with the first merchant in the affinity aggregation account associated with the mobile device.

The affinity pooling application may, in response to the determination that affinity rewards are available to the mobile device (i.e. there is a balance of affinity reward points in the affinity aggregation account associated with the mobile device), present a menu of affinity rewards offered by a number of different affinity reward participants that are available to the mobile device for use in a transaction with a merchant related to the merchant identifier (330). In an example, the number of different affinity reward participants (e.g., enrollees in an aggregation of affinity rewards or by merchants that offer affinity rewards through affinity reward programs). The menu, for example, may be presented on a display of the mobile device as a list of affinity reward information associated with a mobile device identifier. In the example, the list of affinity reward information may include at least one merchant name and a reward value for each of the at least one merchant name.

An affinity reward participant may be a merchant (as an offeror of the affinity rewards), or a mobile device enrolled with the aggregation of affinity reward programs (as a recipient of the affinity rewards). The presented menu may include a total affinity reward value (which is equivalent to the neutral affinity reward value) for the affinity rewards from the affinity aggregation account of the mobile device. For example, the total affinity reward value may be a sum of the affinity reward points listed in the menu that is based on a rewards exchange rate between each affinity reward offered by the number of different affinity reward participants (e.g., consumers or, in a specific example, charitable organization or the like) and the merchant identified by the merchant identifier.

Returning to FIG. 3, a selection of one or more affinity rewards of an affinity rewards program that the mobile device has enrolled into the mobile device's associated aggregation account of affinity rewards from the presented menu may be received (340). In response to the selection, the affinity pooling application executing on the mobile device may apply reward values of the selected one or more affinity rewards to a transaction, and the transaction may be completed between the merchant related to the merchant identifier and a payment card account associated with the mobile device (350).

In the example, each affinity reward value may include an amount or a nature of the affinity reward. For example, the nature of the reward indicates whether the reward is for a particular item available from a respective merchant, a particular time period, a particular service, a discount on an item (e.g., 45% off retail price), or an item in addition to an item being purchased.

Figure 4A:
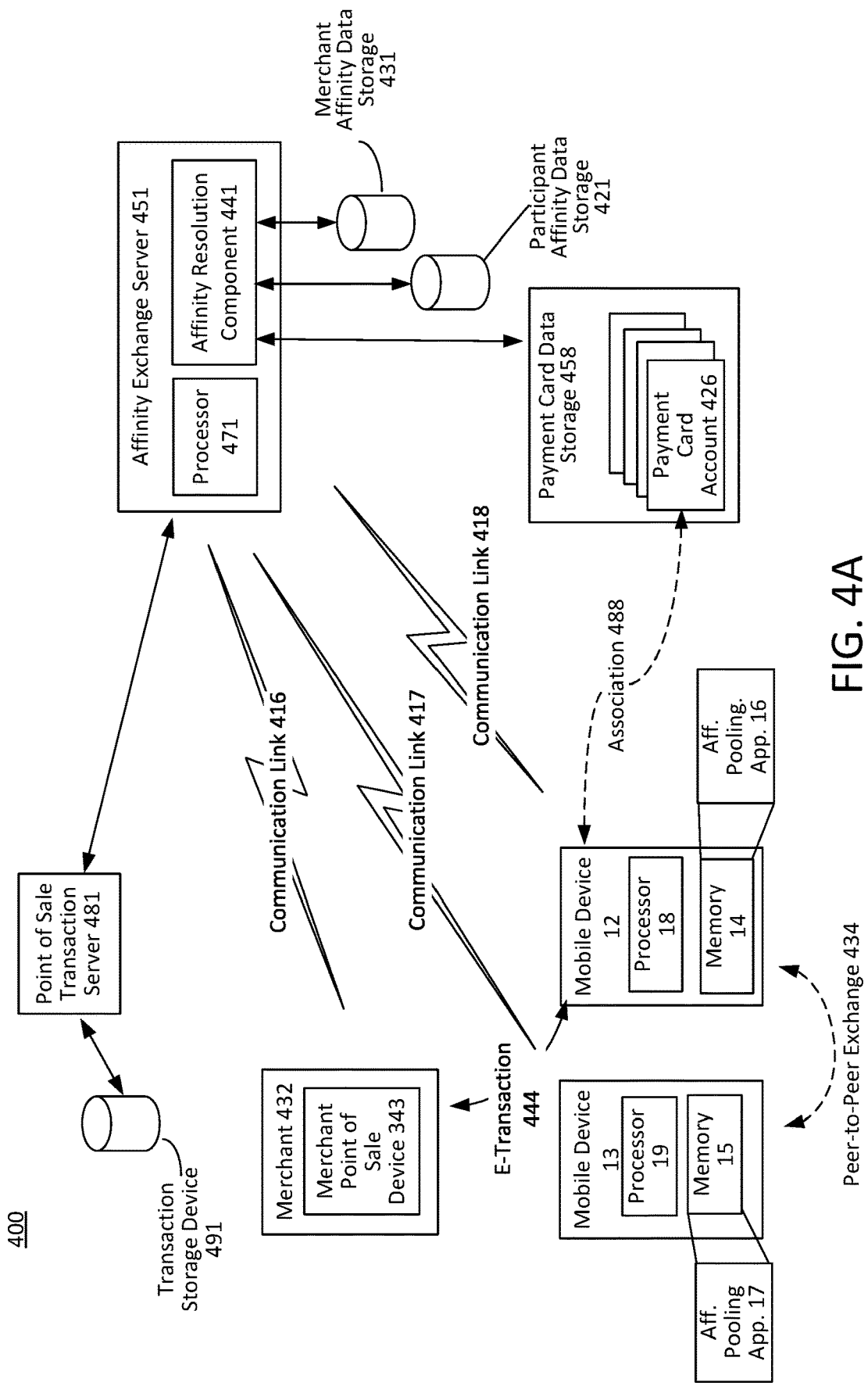
FIG. 4A illustrates elements of the system of FIG. 1 with reference to an example of a process for exchanging affinity reward points.

It may be helpful to describe additional features and advantages provided by the disclosed examples related to the enrolling of a mobile device in the aggregation of affinity reward programs offered via the affinity exchange server, such as 45 of FIG. 1. FIG. 4A illustrates an example of system implementation for discussion of processes provided by an example of an affinity exchange server. An affinity exchange server, such as 451 of FIG. 4A, may be operable to perform functions, such as functions related to the exchange of affinity reward points between participants, a determination of a neutral affinity reward value and other features of the aggregation of affinity reward programs.

In an example, the merchant 432 and merchant point of sale device 343 may communicate with the affinity exchange server 451 (and its respective components, such as processor 471 and affinity resolution component 441) via communication link 416. Similarly, the mobile device 13 may communicate with the affinity exchange server 451 and its respective components via communication link 417, and the affinity exchange server 451 and its respective components may similarly communicate with mobile device 12 via communication link 418. The communication links 416-418 may be a wired or wireless communication link.

The example shown in and described with reference to FIG. 4A is a further example of the process shown in FIG. 3, the system 400 may facilitate an exchange of affinity rewards between the different affinity exchange participants, such as mobile device 13, and the mobile device 12. During the enrollment of a respective mobile device, for example, mobile device 12, the affinity exchange server 451 may pair a merchant, such as 432, that accepts affinity rewards with a payment card account, such as 426, associated with the mobile device 12 (via association 488). For example, the pairing of the merchant 432 with the mobile device 12 may be based on a transaction history of the payment card account 426 obtained from payment card data storage 458. In the example, the process of pairing the merchant 432 that accepts affinity rewards with the payment card account 426 may include receiving, by the affinity exchange server 451, a pairing information request from, for example, the affinity pooling application 16 of mobile device 12, requesting transaction information related to transactions involving the affinity reward accounts (which are stored, for example, in the memory 14 of the mobile device 12). Alternatively, or in addition, the affinity exchange server 451 may receive a pairing information request from an affinity pooling application 16 requesting information related to affinity reward accounts stored on the mobile device 12.

In response to the pairing information request, the affinity exchange server 451 may, for example, contact a point of sale transaction server 481 with a request to provide the information to the affinity pooling application 16 related to one or more affinity reward programs identified by to point of sale transaction server 481 communicatively coupled to the affinity exchange server 451. The one or more affinity reward programs may, for example, be identified based on transactions involving the payment card account 426 associated with mobile device 12. In response to providing the information, the affinity exchange server 451 may receive a confirmation of the pairing from the affinity pooling application 16 executing on the mobile device 12.

Figure 4B:
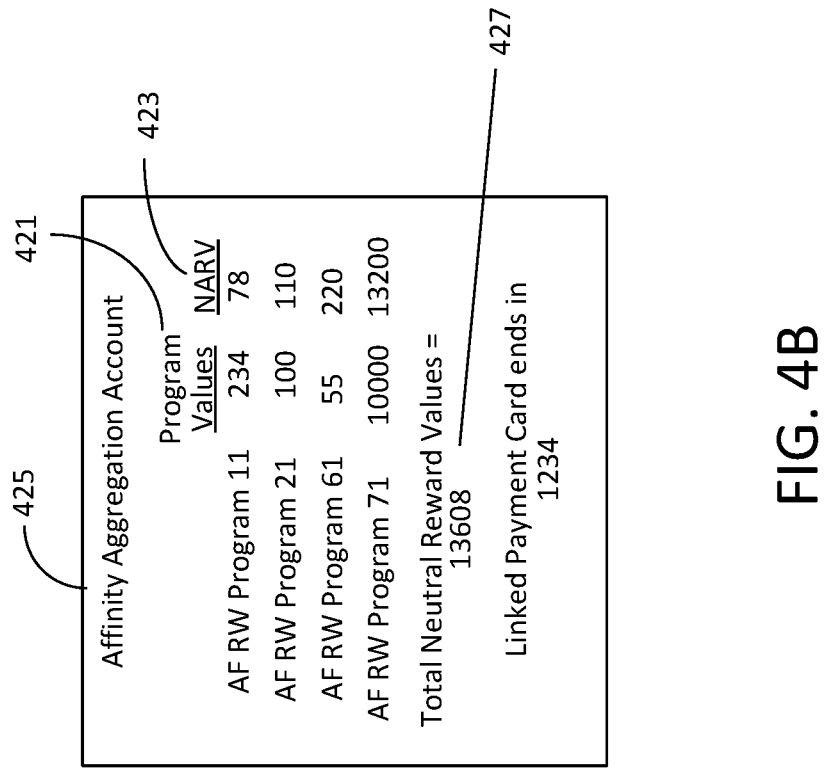
FIG. 4B illustrates an example of a user interface usable in the example process discussed with reference to FIG. 4A.

In the example of FIG. 4B, the affinity pooling application 16 executing on mobile device 12 may be used in e-transaction 444 between the mobile device 12 and the merchant 432 for the purchase of a product or service from the merchant 432. The merchant 432 may offer an affinity reward program of which the mobile device 12 is a participant through the aggregation of affinity reward programs. The aggregated affinity account associated with the mobile device 12 includes, as part of the aggregated affinity account, the affinity reward program associated with the merchant 432 and may have a balance of affinity reward points accepted by the merchant 432. The affinity pooling application 16 operating on the mobile device 12 may be operable to either present an amount of reward points or a reward discount or product/service discount (e.g., a free drink, service or the like) to an operator of or directly to, via a signal to the merchant point of sale device 343. The merchant point of sale device 343 may be operable to note the use of the affinity reward points and to recalculate an amount owed (e.g., balance owed in currency) for the product or service being purchased in the e-transaction 444. The payment card account 426 associated with the mobile device 12 may be billed of remaining amount, or balance, owed in the e-transaction 444. The point of sale transaction server 491 may facilitate the transaction. The affinity resolution component 441 of the affinity exchange server 451 may receive information related to the e-transaction 444 from the affinity pooling application 17 of the mobile device 12 or may request information from the point of sale transaction server 491 regarding the e-transaction 444. The information related to the e-transaction 444 received by the affinity resolution component 441 may include number of affinity reward points used, the affinity reward program, a transaction amount in currency value, a mobile device identifier (or affinity pooling application), or the like. The affinity resolution component 441 may be operable either via execution by the processor 471 or in cooperation with the processor 471, to deduct the amount of reward points redeemed during the e-transaction 444 from the affinity reward program in the aggregated affinity account of the mobile device 12, thereby updating the aggregated affinity account of the mobile device 12. The affinity resolution component 441 may cause the information of the updated the aggregated affinity account to be stored in the participant affinity data storage 421. In the example, the affinity resolution component 441 may be further operable to store information related to the redeemed affinity reward points to be stored in the merchant affinity data storage 431.

Alternatively, or in addition, to the above example of FIG. 4A, the affinity exchange server 451 may be operable to receive a linking request from the affinity pooling application 16 to link one or more affinity reward programs in a single affinity aggregation account associated with the mobile device 12 in the affinity exchange server 451. When mobile devices, such as 12 and 13 are linked under a single affinity aggregation account and one of the mobile devices performs a transaction, such as e-transaction 444, the affinity resolution component 441 may be operable to update the participant information stored in the participant affinity data storage 421 based on the results of the transaction. In addition, the affinity resolution component 441 may be operable to send updated aggregated affinity account information associated with both mobile devices 12 and 13 to the respective affinity pooling application (i.e., 16 and 17) executing on each respective mobile device 12 and 13.

The affinity pooling applications 16 and 17, if the mobile devices are compatibly equipped with Bluetooth or near-field communication devices, may also facilitate a peer-to-peer exchange of affinity rewards. For example, as shown in FIG. 4B, affinity pooling application 16 may receive a command to exchange affinity reward points with affinity pooling application 17. The affinity pooling application 16 may initiate the peer-to-peer exchange 434 of affinity reward points with the affinity pooling application 17 in response to receiving a request from affinity pooling application 17. For example, affinity pooling application 16 executing on the mobile device 13 may initiate a transfer of affinity reward points from a first affinity reward program (e.g., a coffee shop affinity reward program) to the affinity pooling application 17 executing on the mobile device 13 because, for example, the user of mobile device 13 is purchasing a coffee at the coffee shop. The affinity pooling application 17 executing on the mobile device 13 may reciprocate by initiating a transfer of affinity reward points from a second affinity reward program to the affinity pooling application 16 executing on the mobile device 12. During or after the exchange, the respective affinity pooling applications 16 and 17 may report the exchange and the results of the exchange to the affinity resolution component 441. For example, affinity pooling application 16 may imitate the transfer of 100 affinity reward points of a first affinity rewards program may have been transferred from affinity pooling application 16 to affinity pooling application 17 and the affinity pooling application may initiate a transfer of neutral affinity reward points to the affinity pooling application 16 on mobile device 12. The amount of neutral affinity reward points may be dependent upon the exchange rate of the first affinity reward points to the neutral affinity reward point. Based on the details of the peer-to-peer exchange 434 provided by both affinity pooling applications 16 and 17, the affinity resolution component 441 may update the respective aggregated affinity accounts associated with each respective mobile device 12 and 13.

The affinity pooling applications 16 and 17 are also operable to enable the donation of affinity reward points or neutral affinity reward points from one participant to another participant (which may be a charitable organization, such as a homeless shelter, or the like). The donation process is the same as described above with reference to the peer-to-peer exchange 434 or a merchant point of sale device 343 except that the recipient of the donation is an aggregated affinity account of the charitable organization or person receiving the donation.

A function of the affinity exchange server 451 is to establish and maintain an affinity reward exchange rate and a neutral affinity reward value may be described with reference to FIG. 4B. The affinity exchange server 451 may be operable to convert affinity reward values for each of the one or more affinity rewards programs into a neutral affinity reward value.

As shown in FIG. 4B, a user interface 425 may be presented on an output device (e.g., touchscreen display or the like) of the mobile device 12. The user interface 425 may present details related to the affinity aggregation account associated with the mobile device 12. For example, the user interface 425 may present the affinity reward programs, AF RW Program 11, AF RW Program 21, AF RW Program 61, AF RW Program 71, with the respective program values of each the affinity reward programs. In the example, the neutral affinity reward value (NARV) 423, for each affinity reward program (i.e., AF RW Program 11, AF RW Program 21, AF RW Program 61, AF RW Program 71) may be presented in a user interface 425. The NARV 423 may be a value of the individual affinity reward program point values after an affinity reward exchange rate has been applied. For example, the individual NARV values may be based on a conversion rate established based on transaction data obtained from the point of sale transaction server 481 that manages transactions for the payment card account 426 associated with the mobile device 12. In the example, the affinity aggregation account may have a (affinity reward) program value of 234 points and a neutral affinity reward value of 78 for program AF RW Program 11. The affinity reward exchange rate for the 234 points of AF RW Program 11 points may be approximately 0.333, which results in the neutral affinity reward value of approximately 78. Similarly, in the example, the affinity reward exchange rate for: AF RW Program 21 may be approximately 1.1, AF RW Program 61 may be approximately 4.0, and AF RW Program 71 may be approximately 1.32. The user interface 425 may also present a total neutral reward values of 13608, such as 427, that may be in the affinity aggregation account associated with mobile device 12.

Figure 5:
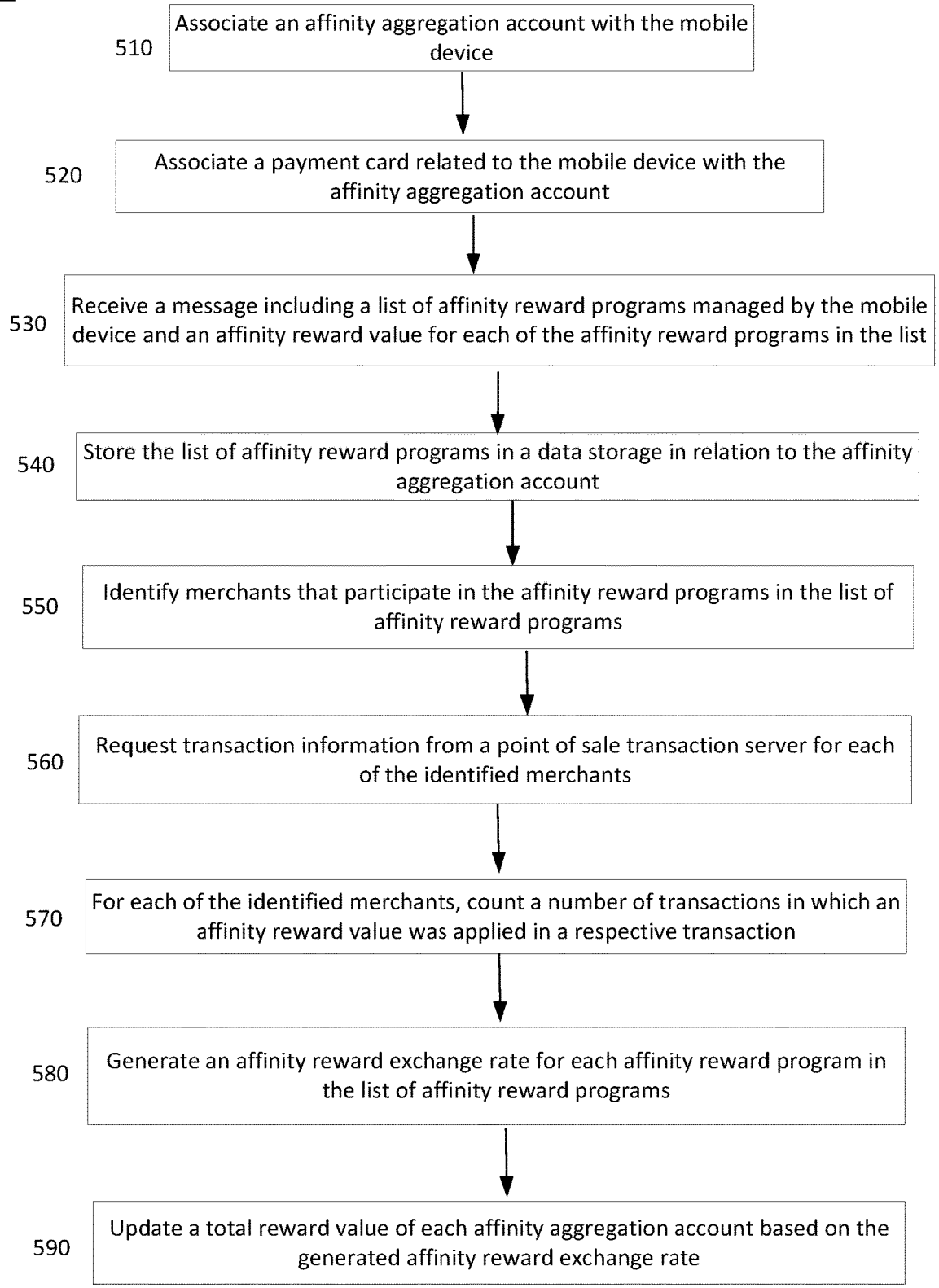
FIG. 5 illustrates a flow chart of an example of a process for generating an affinity reward exchange rate.

FIG. 5 illustrates an example of a process from a viewpoint of the affinity resolution component in affinity exchange server. The example process may be implemented via a non-transitory computer readable medium embodied with programming code having instructions that implement the illustrated process. For example, the programming code embodied on the non-transitory computer readable medium may provide an affinity pooling application which when executed by a processor enables the processor to engage in a transaction utilizing affinity rewards from the selected individual affinity reward program with a point of sale device at a merchant that participates in the selected individual affinity reward program. The affinity pooling application may operate in concert with the affinity resolution component. The affinity resolution component may manage the relationships of the affinity aggregation accounts and the respective mobile devices, merchants' affinity reward programs with the affinity aggregation accounts, and also the generation of an exchange rate and the neutral affinity reward value.

In the example process 500, the affinity resolution component of the affinity exchange server may be operable to, upon receipt of a request from an affinity pooling application associate, at 510, an affinity aggregation account with a mobile device. Upon association of the mobile device with the affinity aggregation account, the affinity resolution component may associate a payment card related to the mobile device with the aggregation account (520). Similar to the enrollment described with reference to an earlier example, the affinity resolution component may receive a message that includes a list of affinity reward programs managed by the mobile device and an affinity reward value for each of the affinity reward programs in the list (530). The list of affinity reward programs may be stored in a data storage, such as merchant affinity data storage 43 of FIG. 1, in relation to an affinity aggregation account associated with the mobile device (540). The affinity resolution component may be further operable to identify merchants that participate in the affinity reward programs in the list of affinity reward programs. For example, the affinity resolution component may access a data storage, such as merchant affinity data storage 43 of FIG. 1, and search for the participating merchants to identify them (550). For example, the affinity resolution component may be operable to identify, in the retrieved transactions, merchants that participate in unselected affinity reward programs for inclusion in the affinity aggregation account associated with the mobile device. The affinity resolution component may send a message to an affinity pooling application executing on the mobile device. The message may, for example, include a list of identified merchants and instructions to generate a prompt with a query as to whether an unselected affinity reward program offered by each respective identified merchant is to be added to the list of affinity rewards programs in the affinity aggregation account associated with the mobile device.

Transaction information may be requested by the affinity resolution component from a point of sale transaction server, such as 48 of FIG. 1, for each of the identified merchants (560). The transaction information may include an indication of an affinity reward program and an affinity reward value related to the aggregation account that were applied in a transaction. At 570, for each of the identified merchants, a number of transactions may be counted in which an affinity reward value was applied in a respective transaction. Based on the counted number of transactions for each respective merchant of the identified merchants, an affinity reward exchange rate may be generated for each affinity reward program in the list of affinity reward programs (580).

In an example, when generating the affinity reward exchange rate, the affinity resolution component may determine that the affinity reward exchange rate relative to a neutral affinity reward value. Upon generating the affinity reward exchange rate, the affinity reward exchange rate for each affinity reward program associated with the aggregation account may be sent to the mobile device (590). The affinity reward exchange rate is relative to a neutral affinity reward value. A total affinity reward value of each affinity aggregation account may be updated based on the generated affinity reward exchange rate. The updated total affinity reward value of each affinity aggregation account may be sent to a mobile device associated with each affinity aggregation account.

In furtherance of the example, the affinity resolution component, such as 44 in FIG. 1, may receive a request for updated transaction information from a point of sale transaction server, such as 48 in FIG. 1 for each of the identified merchants. The updated transaction information may include an indication of an affinity reward program used in each subsequent transaction and an updated affinity reward value related to the aggregation account that was applied in each subsequent transaction. In the further example, for each of the identified merchants, the affinity resolution component may count a number of subsequent transactions in which the updated affinity reward value was applied in a respective subsequent transaction. Based on the counted number of transactions for each respective merchant of the identified merchants, an updated affinity reward exchange rate may be generated for each affinity reward program in the list of affinity reward programs. The updated affinity reward exchange rate may, for example, be relative to the neutral affinity reward value. The updated affinity reward exchange rate for each affinity reward program associated with the aggregation affinity account may be sent to the mobile device.

In another example, the affinity resolution component may be operable to retrieve transactions of the payment card associated with the aggregation account from the point of sale transaction server. The affinity resolution component may be further operable to identify, in the retrieved transactions, merchants that participate in affinity reward programs not managed by the mobile device. The affinity resolution component may generate a message. The message may, for example, include a list of identified merchants and instructions to generate a prompt with a query as to whether an affinity reward program offered by each respective identified merchant is to be added to the list of affinity rewards programs included in the affinity aggregation account associated with the mobile device. The affinity resolution component may be operable to send the message to an affinity pooling application executing on the mobile device. Upon receipt of an affirmative response from the mobile device relative to a respective affinity reward program selected for inclusion in the affinity aggregation account, the affinity resolution component may update the affinity aggregation account associated with the mobile device to include the selected identified merchant and the affinity reward program offered by the respective identified merchant in the affinity aggregation account associated with the mobile device.

In another example, the affinity resolution component may be responsive to other requests from an affinity pooling application executing on a mobile device. For example, the affinity pooling application may request that a first affinity aggregation account be linked by the application resolution component to another (e.g. a second) affinity aggregation account. For example, spouses may want to share their respective affinity rewards with one another without having to share an affinity aggregation account. The affinity resolution component may be operable, in response to a linking request from the mobile device, to link the other (second) aggregation account with the aggregation account associated with the mobile device that generated the request. In the example, the other aggregation account is associated with a different mobile device and may include at least one affinity reward group in the aggregation account associated with the mobile device making the linking request. The affinity resolution component upon receiving permission from an affinity pooling application executing on the different mobile device may be operable to link the first and second affinity aggregation accounts in response to the request.

The affinity pooling application may also enable a user to enter user preferences for functions of the affinity pooling application. In example, the affinity resolution component may receive, via the affinity pooling application executing on the mobile device, user preferences for the aggregation account associated with the mobile device with respect to the other aggregation account linked to the aggregation account with the mobile device. For example, the user preferences may include instructions related to the sharing of affinity reward values between the other affinity aggregation account associated with a different mobile device and the affinity aggregation account associated with the mobile device, exchanging affinity reward values between the other aggregation account and the affinity aggregation account associated with the mobile device, donating affinity reward values to the other affinity aggregation account from the affinity aggregation account associated with the mobile device, or the like.

For example, with regard to donating affinity rewards to other affinity aggregation accounts, the affinity resolution component may be operable to receive, via the affinity pooling application executing on the mobile device, user donation preferences related to donating unused affinity reward values to a selected one or more aggregation accounts. In the example, the user donation preferences may include instructions related to which affinity reward program unused affinity reward values are to be donated and when the unused affinity reward values are to be donated.

Figure 6:
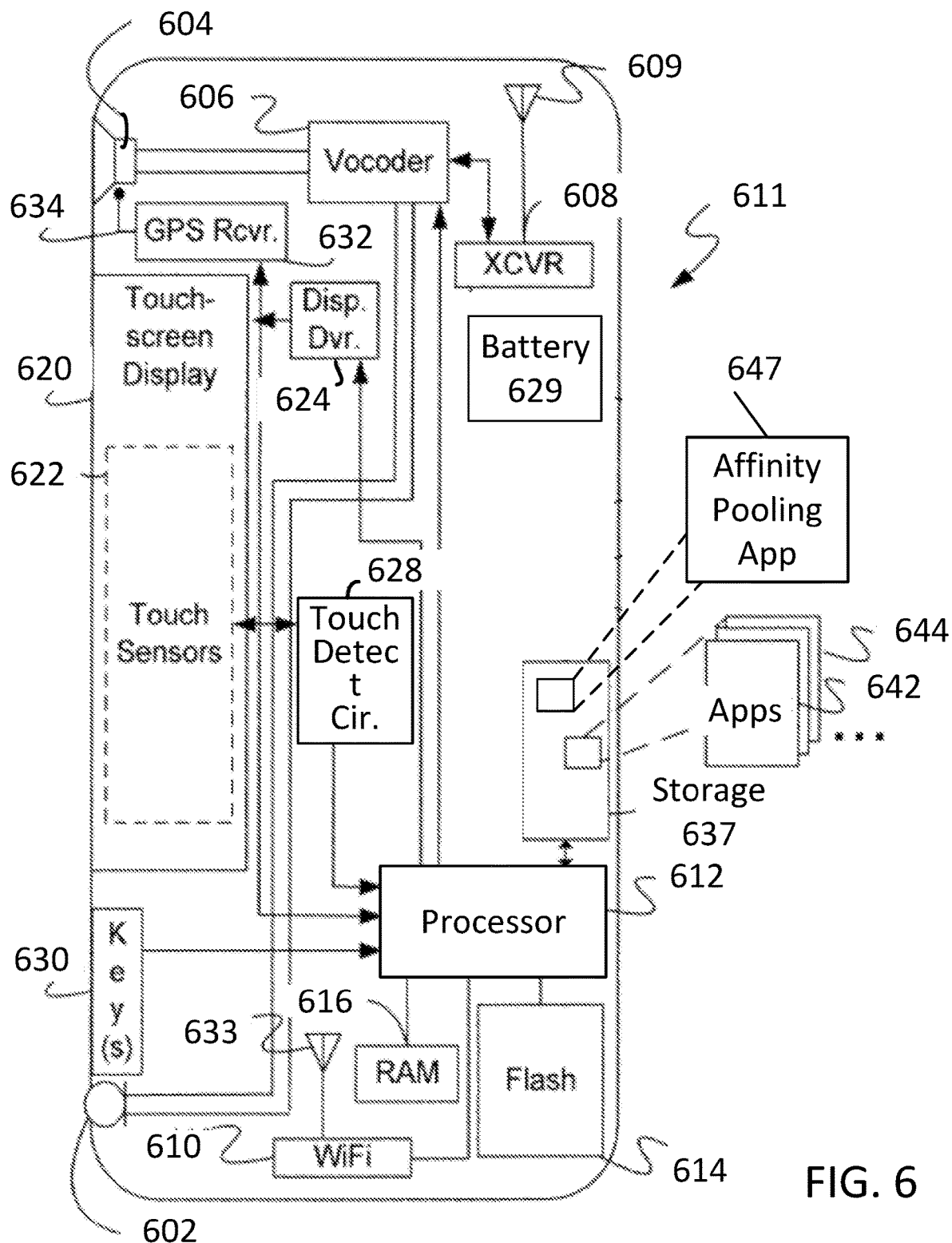
FIG. 6 illustrates an example of a mobile device usable for implementing the techniques and processes discussed with reference to the examples of FIGS. 1-5.

FIG. 6 illustrates an example of a mobile device usable for implementing the techniques and processes discussed with reference to the examples of FIGS. 1-5.

The mobile device 611 may be a smart phone including a display device, such as a touch screen display 620. The touch screen display 620 may be coupled to the processor 612 and be operable to present screen content and receive inputs via touch sensors 622. Examples of touch screen type mobile devices, such as mobile device 611, may include (but are not limited to) a smart phone, personal digital assistant (PDA), tablet computer, smart watch, or another portable device. However, the structure and operation of mobile device 611 that utilizes a touch screen is provided by way of example; and the subject technology as described herein is not intended to be limited thereto. For purposes of this discussion, FIG. 6 provides a block diagram illustration of an example of the mobile device 611 having a touch screen display for displaying content and receiving user input as (or as part of) the user interface.

There are a variety of ways that a mobile device 611 may be configured to obtain information as to current location of the device. In our example, the mobile device 611 includes a global positioning satellite (GPS) receiver 632 and associated antenna 634. GPS is a space-based satellite navigation system that provides location and time information practically anywhere on Earth. A rechargeable battery 629 may provide electrical power sufficient to power the various components of the mobile device 611.

A mobile device supporting the affinity pooling application and techniques described herein may include a variety of different types of user interface elements. For discussion purposes, in the smart phone example of a mobile device shown in FIG. 6, the user interface elements of mobile device 611 include a touch screen display 620 (also referred to herein as "touch screen 620" or "display 620"). For output purposes, the touch screen 620 includes a display screen, such as a liquid crystal display (LCD) or the like. For input purposes, touch screen display 620 includes a plurality of touch sensors 622. Other interface elements may include a keypad including one or more keys 630. For example, the keypad may be implemented in hardware as a T9 or QWERTY keyboard of mobile device 611 and keys 630 may correspond to the physical keys of such a keyboard. Alternatively, keys 630 (and keyboard) of mobile device 611 may be implemented as "soft keys" of a virtual keyboard graphically represented in an appropriate arrangement via touch screen display 620. The soft keys presented on the touch screen display 620 may allow the user of mobile device 611 to invoke the same user interface functions as with the physical hardware keys. In some implementations, the microphone 602 and speaker 604 may be used as additional user interface elements, for audio input and output, including with respect to some functions related to the processing related to engaging with the affinity pooling application 647, as described herein. In a further example, the affinity pooling application 647 may in response to accessing contacts stored in the mobile device memory 614, present in the user interface, such as 425 of FIG. 4B, a prompt to send a request to one or more of the contacts to join an affinity reward group.

For output, touch screen display 620 is a display device used to present information (e.g., text, video, graphics or other visible content) to the user of mobile device 611. Processor 612 controls visible display output on the LCD or other display element of the touch screen display 620 via a display driver 624, to present the various visible outputs to the device user.

In general, touch screen display 620 and touch sensors 622 (and one or more keys 630, if included) are used to provide the textual and graphical user interface for the mobile device 611. In an example, touch screen display 620 provides viewable content to the user at mobile device 611. Touch screen display 620 also enables the user to interact directly with the viewable content provided in the content display area, typically by touching the surface of the screen with a finger or an implement such as a stylus.

As shown in FIG. 6, the mobile device 611 also includes a touch detect circuit 628 coupled to touch sensors 622 for detecting the occurrence and relative location/position of each touch with respect to a content display area of touch screen display 620. In this example, touch detect circuit 628 is configured to provide processor 612 with touch-position information based on user input received via touch sensors 622. In some implementations, processor 612 is configured to correlate the touch position information to specific content being displayed within the content display area on touch screen display 620. The touch-position information captured by touch detect circuit 628 and provided to processor 612 may include, but is not limited to, coordinates identifying the location of each detected touch with respect to the display area of touch screen display 620 and a timestamp corresponding to each detected touch position.

In the example shown in FIG. 6, the mobile device 611 includes a microphone 602 for audio signal input and a speaker 604 for audio signal output. The microphone 602 and speaker 604 are communicatively coupled to a voice or audio encoder/decoder (vocoder) 606. For a voice telephone call, for example, the vocoder 606 provides two-way conversion between analog audio signals representing speech or other audio and digital samples at a compressed bit rate compatible with the digital protocol of wireless telephone network communications or voice over packet (e.g., Internet Protocol) communications. The vocoder, speaker and microphone may also be used as elements of the user interface during other operations of the device, including some types of transaction communications.

Also, as shown in FIG. 6, the mobile device 611 includes at least one transceiver (XCVR) 608, which may be a digital transceiver for digital wireless communications via a wide area wireless mobile communication network, although the mobile device 611 may include additional digital or analog transceivers (not shown). The transceiver 608 conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." For example, transceiver 608 provides two-way wireless communication of information including digitized audio signals, still image and/or video signals, web page information for display as well as web related inputs, and various types of mobile message communications to/from the mobile device 611. Transceiver 608 connects through radio frequency (RF) send-and-receive amplifiers (not separately shown) to an antenna 609. Transceiver 608 may also support various types of mobile messaging services, such as short message service (SMS), enhanced messaging service (EMS), and/or multimedia messaging service (MMS).

In an example, the transceiver 608 may be coupled to the processor 612 and operable to exchange communications. The processor 612 of the mobile device 611 may be further operable to perform additional functions, including functions to establish, using the transceiver, a connection with a server, such as affinity exchange server 45 of FIG. 1, to exchange communications. Via the connection with the server, the mobile device 611 may be able to obtain various information, such as an affinity reward exchange rate, a neutral affinity reward value, affinity aggregation account-related information, and the like. The processor upon execution of the affinity pooling application 647 may implement the examples as discussed above with reference to FIGS. 1-5.

The mobile device 611 may also include a Wi-Fi transceiver 610 and associated antenna 633. Although Wi-Fi is used here as the example, the transceiver 610 may take the form of any available two-way wireless local area network transceiver of a type that is compatible with one or more standard protocols of communication implemented in wireless local area networks, such as one of the Wi-Fi standards under IEEE 802.11 and/or WiMAX.

The mobile device 611 further includes a processor 612, which serves as a programmable controller for mobile device 611 by configuring mobile device 611 to perform various operations, for example, in accordance with instructions or programming executable by processor 612. For example, such operations may include various general operations of the mobile device 611 as well as operations related to the screen brightness adjustment as described herein. A flash memory 614 may be used to store, for example, programming or instructions for execution by the processor 612. Depending on the type of device, the mobile device 611 stores and runs an operating system through which specific applications may be run on the device. Examples of operating systems include Android, Apple iOS, Microsoft Windows OS, Bada, Tizen, Symbian OS, Blackberry OS, or the like. Flash memory 614 may also be used to store mobile configuration settings for different mobile applications or services executable at mobile device 611 (using processor 612). Mobile device 611 may also include a non-volatile random-access memory (RAM) 616 for a working data processing memory. The RAM memory 616 or storage 637 may be coupled to the processor 612 and operable to store programming code executable by the 612 processor.

Alternatively, or in addition, applications may be stored in storage 637, which may be a solid-state memory storage or other memory device suitable for storing applications. In one example, the storage 637 may be a separate chip that includes tamperproof storage and execution memory and is configured to communicate with operating system. The storage 637 may, for example, store an instance of an affinity pooling application 647 for processing the screen brightness adjustment of the mobile device 611. Other applications such as 642 and 644 may also be stored in storage 637.

The logic implemented by the processor 612 of the mobile device 611 configures the processor 612 to control various functions as implemented by the mobile device 611. The logic for a processor may be implemented in a variety of ways, but in the presented examples, the processor logic is implemented by programming for execution by the processor 612.

Figure 7:
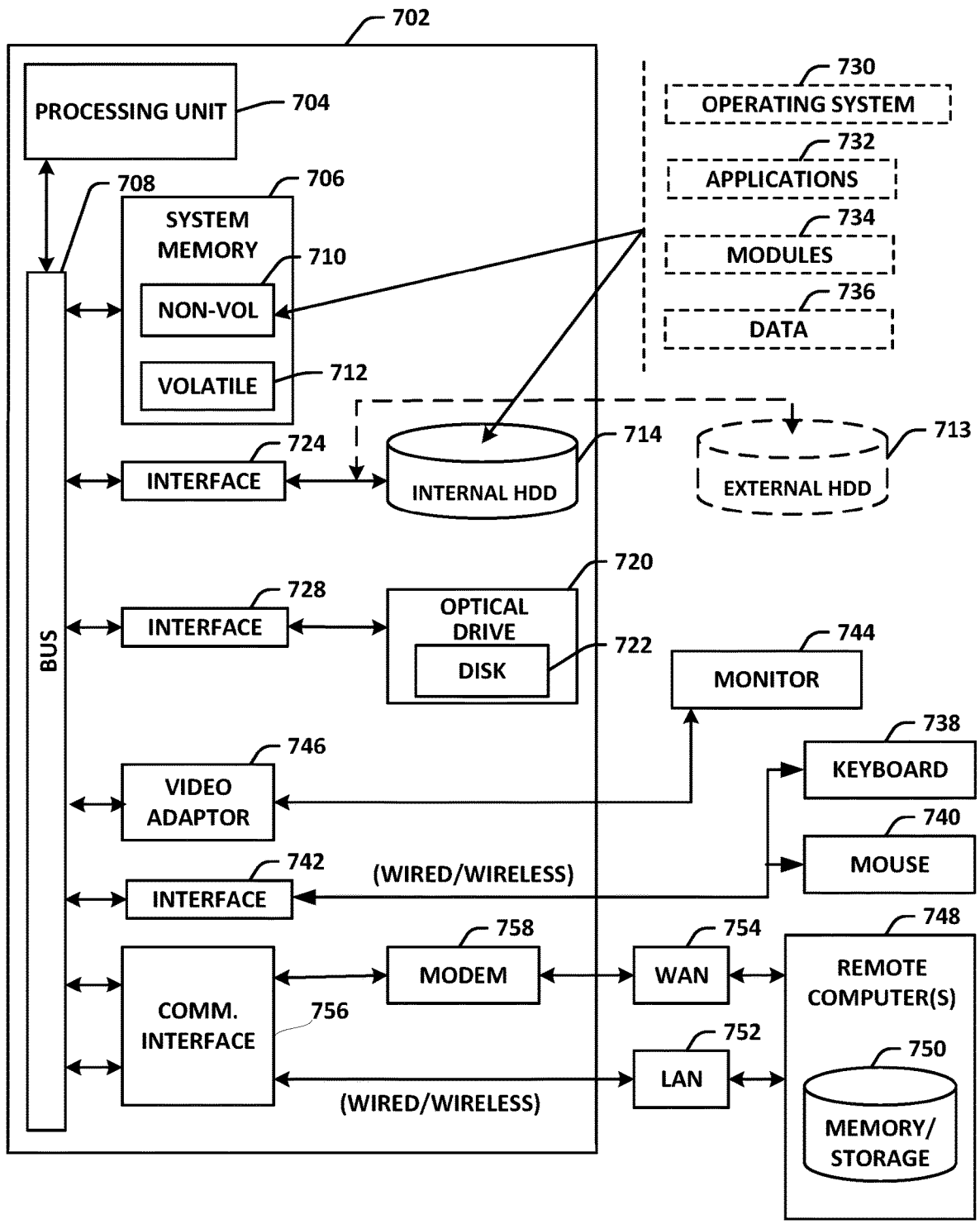
FIG. 7 illustrates an example of a computing architecture suitable for implementing components of the system examples and for providing the processes discussed in the process examples.

FIG. 7 illustrates an example of a computing architecture suitable for implementing various examples as previously described. In one example, the computing architecture 700 may include or be implemented as part of system 100 or 400. In another example, the computer architecture 700 include components of a system optimizing apparatus as well as other components that may optionally be part of the system optimizing apparatus.

As used in this application, the terms "system" and "component" are intended to refer to a computer-related entity, either hardware, a combination of hardware and software, software, or software in execution, examples of which are provided by the exemplary computing architecture 500 as well as the examples of FIGS. 1, 2, 4A and 6. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server or a processor and the server or the processor can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further examples, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The examples, however, are not limited to implementation by the computing architecture 700.

As shown in FIG. 7, the computer architecture 700 includes a processing unit 704, a system memory 706 and a system bus 708. The processing unit 704 can be any of various commercially available processors. Merchant 121 or 123, merchant point of sale devices 21 or 23, affinity exchange server 45 and components thereof, point of sale transaction server 48, retail affinity server 55 or corporate affinity server 53 (and a corporate affinity storage device 54), affinity exchange server 451 and components thereof, merchant point of sale device 343, point of sale transaction server 481 of FIG. 4 may incorporate one or more of the components of the computer architecture 700, such as the processing unit 704, the system memory 706 and so on. Other components, such as the keyboard 738 and the mouse 740, may be omitted in some examples, but may be used in components such as the triage processing console 170 or the like.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Examples may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the example shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714 or 713, and an optical disk drive 720 to read from or write to a removable optical disk 722 (e.g., a CD-ROM or DVD). The HDD 714 and optical disk drive 720 can be connected to the system bus 708 by an HDD interface 724 and an optical drive interface 728, respectively. The HDD interface 724 for external drive implementations can include at least one or both of Universal Serial Bus (USB) and IEEE 1394 interface technologies. The drives and associated computer-readable media provide volatile and/or nonvolatile storage of data, data structures, computer-executable instructions, and so forth. For example, several program modules can be stored in the drives and memory units 710, 712, including an operating system 730, one or more application programs 732, other program modules 734, and program data 736. In one example, the one or more application programs 732, other program modules 734, and program data 736 can include, for example, the various applications and/or components of the computer architecture 700.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 704 through an input device interface 742 that is coupled to the system bus 708 but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication interface 756. The communication interface 756 can facilitate wire and/or wireless communications to the LAN 752, which may also include a wireless access point disposed thereon for communicating with the wireless functionality of the communication interface 756.

When used in a WAN networking environment, the computer 702 can include a modem 758, or is connected to a communications server on the WAN 754 or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown in FIG. 7 (as well as those of FIG. 1 FIG. 4A) are exemplary and other means of establishing a communications link between the computers can be used.

The computer 702 is operable to communicate with wired and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-7 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

As used in this application, the terms "system", "component" and "unit" are intended to refer to a computer-related entity, either hardware, a combination of hardware and software, software, or software in execution, examples of which are described herein. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further examples, however, may alternatively employ data messages. Such data messages may be sent across various connections. Exemplary connections include parallel interfaces, serial interfaces, and bus interfaces.

Some examples may be described using the expression "one example" or "an example" along with their derivatives. These terms mean that a particular feature, structure, or characteristic described in connection with the example is included in at least one example. The appearances of the phrase "in one example" in various places in the specification are not necessarily all referring to the same example. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure, process, or method is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more examples. Rather, the operations are machine operations. Useful machines for performing operations of various examples include general purpose digital computers or similar devices.

Some examples may be described using the expression "coupled" and "connected" along with their derivatives. These terms are not necessarily intended as synonyms for each other. For example, some examples may be described using the terms "connected" and/or "coupled" to indicate that two or more elements are in direct physical or electrical contact with each other. The term "coupled," however, may also mean that two or more elements are not in direct contact with each other, but still co-operate or interact with each other.

Various examples also relate to apparatus or systems for performing these operations. This apparatus may be specially constructed for the described purpose or it may comprise a general-purpose computer as selectively activated or reconfigured by a computer program stored in the computer. The procedures or processes presented herein are not inherently related to a particular computer or other apparatus. Various general-purpose machines may be used with programs written in accordance with the teachings herein, or it may prove convenient to construct more specialized apparatus to perform the required method steps. The structure for a variety of these machines appears from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method comprising:
   receiving, at an affinity exchange server, a request to exchange affinity rewards associated with a mobile device, wherein the request was sent from an affinity pooling application executing on a mobile device and the request includes a merchant identifier identifying a merchant affinity rewards program;
   enrolling, via an affinity pooling application in communication with the affinity exchange server and executing on the mobile device, the mobile device with the affinity exchange server to facilitate an exchange of affinity rewards between different affinity exchange participants and the mobile device;
   pairing a merchant that accepts affinity rewards with a payment card account associated with the mobile device based on a transaction history of the payment card account;
   receiving a linking request from the application pooling device to link one or more affinity reward programs in a single aggregated affinity account associated with the mobile device in the affinity exchange server;
   in response to linking the one or more affinity reward programs in the single aggregated affinity account, converting affinity reward values for each of the one or more affinity rewards programs into a neutral affinity reward value specific to a respective one or more affinity reward programs specific to a merchant identifier;
   determining by the affinity exchange server that affinity rewards associated with the merchant identifier are available to the mobile device, wherein each affinity reward of the affinity rewards has a reward value specific to the merchant identifier and a respective neutral affinity reward value in the single aggregated affinity account;

in response to the determination that affinity rewards are available to the mobile device, presenting, via the affinity pooling application, a menu of affinity rewards offered by a plurality of different holders of respective affinity aggregation accounts that are available to the mobile device for use in a transaction with a merchant related to the merchant identifier, wherein:

the presented menu of affinity rewards includes a total affinity reward value for the affinity rewards listed in the presented menu, wherein the total affinity reward value is based on an affinity reward exchange rate calculated based on a counted number of transactions for each respective merchant identified by the affinity exchange server;

receiving a selection of one or more affinity rewards of an aggregation account of affinity rewards from the presented menu; and completing a transaction between the merchant related to the merchant identifier and a payment card account associated with the mobile device in which reward values of the selected one or more affinity rewards are applied to the transaction.

2. The method of claim 1, further comprising:
receiving from the affinity pooling application executing on the mobile device, a request to access the affinity exchange server; and
presenting on a display of the mobile device, a list of affinity reward information associated with a mobile device identifier, wherein the list of affinity reward information includes at least one merchant name and a reward value of the affinity reward for each of the at least one merchant name.

3. The method of claim 1, wherein:
each affinity reward value includes an amount or a nature of a reward, and
the nature of the reward indicates whether the reward is for a particular item available from a respective merchant, a particular time period, a particular service, or an item in addition to an item being purchased.

4. The method of claim 1, wherein pairing the merchant that accept affinity rewards with the payment card account, further comprises:
receiving a pairing information request from the affinity pooling application requesting information related to affinity reward accounts stored on the mobile device;
providing information to the affinity pooling application related to one or more affinity reward programs identified by a point of sale transaction server coupled to the affinity exchange server, wherein the one or more affinity reward programs are identified based on transactions involving the payment card account; and
receiving a confirmation of the pairing from the affinity pooling application executing on the mobile device.

5. The method of claim 1, wherein the neutral affinity reward value is based on a conversion rate established based on transaction data obtained from a transaction server that manages transactions for the payment card account associated with the mobile device.

6. A system, comprising:
an affinity exchange server comprising a processor and an affinity resolution component, wherein the affinity resolution component is operable to manage an aggregation of affinity rewards programs for a plurality of affinity reward program enrollees, and is further operable to:

identify transactions for each respective merchant of a plurality of merchants participating in an affinity reward program; and
calculate an affinity reward exchange rate based on a counted number of transactions identified for each respective merchant by the affinity exchange server; and a mobile device comprising a mobile device processor, a radio-frequency transceiver, a communication interface operable to connect to an enterprise network via a data network, an output, and a mobile device memory that stores an affinity pooling application, wherein:
the mobile device is a participating device in one or more individual affinity reward programs; and
the affinity pooling application stored in the mobile device memory when executed by the mobile device, the affinity pooling application is operable to:
enroll the mobile device in the aggregation of affinity reward programs in the affinity exchange server, wherein enrolling includes providing affinity reward program information related to one or more individual affinity reward programs in which the mobile device is the participating device;
in response to the enrolling, the mobile device receives a mobile device aggregation account number that is related to a payment card associated with the mobile device, and each of the one or more individual affinity reward programs is associated as an affinity reward group under the mobile device aggregation account number;
present on a mobile device a cumulative neutral value of the affinity rewards points from each of the one or more individual affinity reward programs associated in the affinity reward group;
select an individual affinity reward program of the one or more individual affinity reward programs from the affinity reward group for use in a transaction with a merchant that accepts affinity rewards associated with the selected individual affinity reward program;
present the selected individual affinity reward program, an affinity reward value of affinity rewards associated with the selected individual affinity reward program, and a neutral affinity reward value for the affinity reward value of affinity rewards associated with selected individual affinity reward program, wherein the neutral affinity reward value is based on the affinity reward exchange rate; and
engage in a transaction utilizing affinity rewards from the selected individual affinity reward program with a point of sale device at a merchant that participates in the selected individual affinity reward program.

7. The system of claim 6, wherein the affinity pooling application when executed by the mobile device is further operable to:
indicate to the affinity exchange server a selection of another affinity reward program in the aggregation of affinity reward programs for presentation of additional information on an output of the mobile device;
receive a reward value of affinity rewards available from the selected other affinity reward program; and
present, on the output of the mobile device, the received reward value with a prompt to select additional affinity rewards to be converted from the neutral affinity reward value.

8. The system of claim 6, wherein:
the neutral affinity reward value of the affinity rewards points from each of the one or more individual affinity reward programs associated in the affinity reward group is determined by the affinity exchange server using an affinity reward exchange rate.

9. The system of claim 6, wherein the affinity exchange server when enrolling the mobile device in the aggregation of affinity rewards programs, performs functions, including functions to:
collect information related to one or more affinity rewards programs in which the mobile device is a participant;
associate each of the one or more affinity programs with the payment card related to the mobile device aggregation account number;
access transaction records via a point of sale transaction server;
based on the accessed transaction records, identify merchants that offer affinity reward programs;
review the collected information to determine whether the mobile device is a participant in the affinity reward programs offered by the identified merchants; and
in response to a result of the review indicating the mobile device is a non-participant in the affinity reward programs offered by the identified merchant, send a notification to the mobile device providing an option to join the affinity reward programs.

10. The system of claim 6, wherein the affinity exchange server is further operable to perform additional functions, including functions to:
identify each individual affinity reward program that the mobile device has included during enrollment in the aggregation of affinity reward programs to be managed by the affinity exchange server;
obtain affinity reward values for rewards from the affinity reward program information provided by the mobile device during enrollment;
retrieve transaction information from a point of sale transaction server, wherein the retrieved transaction information is related to transactions executed by merchants that participate in each identified, individual affinity reward program;
based on the retrieved transaction information, generate a neutral affinity reward exchange rate for an affinity reward value for each individual affinity reward program of the affinity reward programs;
using the generated neutral affinity reward exchange rate for the affinity reward value for each individual affinity reward program, convert the affinity reward value for each individual affinity reward program that the mobile device included during enrollment to a neutral affinity reward value; and
send the generated neutral affinity reward exchange rate for the affinity reward value for each individual affinity reward program and the neutral affinity reward value for each individual affinity reward program to the mobile device.

11. The system of claim 6, further comprising:
a point of sale transaction server comprising a processor coupled to a transaction storage device and a communication interface, wherein the point of sale transaction server is coupled via the communication interface to the data network, the enterprise network, the affinity exchange server, and the mobile device,
the point of sale device is operable to perform functions, including functions to:
receive from the mobile device an indication of affinity reward values to be applied to a transaction;
send acknowledgement of receipt of affinity reward values to be applied to the transaction to the mobile device;
apply the indicated affinity reward values to a transaction price;
receive payment via a payment card account associated with the mobile device for a balance of the transaction price remaining after application of the indicated affinity reward values applied to the transaction price; and
confirm payment of the balance of the transaction price with the point of sale transaction server.

12. The system of claim 6, wherein the affinity pooling application when executed by the mobile device is further operable to:
present, in response to accessing contacts stored in the mobile device memory, a prompt to send a request to one or more of the contacts to join the affinity reward group.

13. A non-transitory computer readable medium embodied with programming code that when executed causes a processor to perform functions, including functions to:
associate an aggregation account with a mobile device;
associate a payment card related to the mobile device with the aggregation account;
receive a message including a list of affinity reward programs associated with the mobile device and an affinity reward value for each affinity reward program in the list of affinity reward programs;
store the list of affinity reward programs in a data storage in relation to the aggregation account;
identify merchants that participate in the affinity reward programs in the list of affinity reward programs;
request transaction information from a point of sale transaction server for each of the identified merchants, wherein the transaction information includes an indication of an affinity reward program and an affinity reward value related to the aggregation account that were applied in a transaction;
for each of the identified merchants, count a number of transactions in which an affinity reward value was applied in a respective transaction;
based on the counted number of transactions for each respective merchant of the identified merchants, calculate an affinity reward exchange rate for each affinity reward program in the list of affinity reward programs;
send the calculated affinity reward exchange rate for each affinity reward program associated with the aggregation account to the mobile device; and
update a total affinity reward value of each affinity aggregation account based on the calculated affinity reward exchange rate; and
send the updated total affinity reward value of each affinity aggregation account to a respective mobile device associated with each affinity aggregation account.

14. The non-transitory computer readable medium of claim 13, further embodied with programming code that when executed causes a processor to perform functions, including functions to:
request updated transaction information from a point of sale transaction server for each of the identified merchants, wherein the updated transaction information includes an indication of an affinity reward program used in each subsequent transaction and an updated affinity reward value related to the aggregation account that was applied in each subsequent transaction;

for each of the identified merchants, count a number of subsequent transactions in which the updated affinity reward value was applied in a respective subsequent transaction;

based on the counted number of subsequent transactions for each respective merchant of the identified merchants, generate an updated affinity reward exchange rate for each affinity reward program in the list of affinity reward programs, wherein the updated affinity reward exchange rate is relative to a neutral affinity reward value; and send the updated affinity reward exchange rate for each affinity reward program associated with the aggregation account to the mobile device.

15. The non-transitory computer readable medium of claim 13, further embodied with programming code that when executed causes a processor to perform functions, including functions to:

retrieve transactions of the payment card associated with the aggregation account from the point of sale transaction server;

identify, in the retrieved transactions, merchants that participate in unselected affinity reward programs for inclusion in the affinity aggregation account associated with the mobile device;

send a message to an affinity pooling application executing on the mobile device, wherein the message includes a list of identified merchants and instructions to generate a prompt with a query as to whether an unselected affinity reward program offered by each respective identified merchant is to be added to the list of affinity rewards programs in the affinity aggregation account associated with the mobile device; and upon receipt of an affirmative response from the mobile device relative to a respective affinity reward program, update the affinity aggregation account associated with the mobile device to include the respective identified merchant and the affinity reward program offered by the respective identified merchant.

16. The non-transitory computer readable medium of claim 13, further embodied with programming code that when executed causes a processor to perform functions, including functions to:

in response to a linking request from the mobile device, link another aggregation account with the aggregation account associated with the mobile device, wherein:

the other aggregation account is associated with a different mobile device that is different than the mobile device making the linking request, and includes at least one affinity reward group in the aggregation account associated with the mobile device making the linking request.

17. The non-transitory computer readable medium of claim 16, further embodied with programming code that when executed causes a processor to perform functions, including functions to:

receive, via an affinity pooling application executing on the mobile device, user preferences for the aggregation account associated with the mobile device with respect to the other aggregation account linked to the aggregation account associated with the mobile device, wherein the user preferences include instructions related to:

sharing of affinity reward values between the other aggregation account and the aggregation account associated with the mobile device, exchanging affinity reward values between the other aggregation account and the aggregation account associated with the mobile device, or donating affinity reward values to the other aggregation account from the aggregation account associated with the mobile device.

18. The non-transitory computer readable medium of claim 16, further embodied with programming code that when executed causes a processor to perform functions, including functions to:

receive, via an affinity pooling application executing on the mobile device, user donation preferences related to donating unused affinity reward values to a selected one or more aggregation accounts, wherein the user donation preferences include instructions related to which affinity reward program unused affinity reward values are to be donated and when the unused affinity reward values are to be donated.

\* \* \* \* \*